United States Patent [19]
Gould, Jr.

[11] 3,916,252
[45] Oct. 28, 1975

[54] THYRATRON SAFETY CIRCUIT

[75] Inventor: William I. Gould, Jr., Silver Spring, Md.

[73] Assignee: The United States of America as represented by the Secretary of the Army, Washington, D.C.

[22] Filed: Feb. 25, 1959

[21] Appl. No.: 795,564

[52] U.S. Cl............ 315/149; 102/70.2 R; 250/384; 250/390; 317/9 AC; 328/8; 328/9
[51] Int. Cl........................ H05b 41/36; H02b 7/20
[58] Field of Search....... 250/384; 313/54; 315/119, 315/121, 125, 149, 349, 353; 102/70.2 R; 328/8, 9; 317/9 ME, 9 AC

[56] References Cited
UNITED STATES PATENTS
1,061,522 4/1954 France.............................. 102/70.2
2,571,027 10/1951 Garner........................... 315/125 X Primary Examiner—Maynard R. Wilbur
Assistant Examiner—S. C. Buczinski
Attorney, Agent, or Firm—Nathan Edelberg; Robert P. Gibson; Saul Elbaum

EXEMPLARY CLAIM

1. In combination with a firing circuit having a gas-tube thyratron, an electronic safing circuit for maintaining the firing circuit safe in the presence of a nuclear explosion without permanently dudding the firing circuit for use after the explosion is over; said firing circuit comprising in addition to said thyratron: means applying a cut-off bias to said thyratron, means for applying an input signal to overcome said bias and fire said thyratron, a firing capacitor, means for charging said capacitor to a voltage sufficient to fire said thyratron, and a load, said thyratron, capacitor and load being connected so that the firing of said thyratron by said input signal causes said capacitor to discharge through said thyratron to activate said load; said safing circuit comprising: a second gas-tube thyratron located so as to be at least as sensitive to firing by a nuclear explosion as is the gas-tube thyratron of said firing circuit, means biasing said second thyratron to cut-off, and means connecting said second thyratron effectively in parallel with said firing capacitor; the occurrence of a nuclear explosion thereby causing said second thyratron to fire no later than simultaneously with the thyratron of said firing circuit, whereupon said second thyratron effectively shorts out said capacitor so that substantially no energy flows to said load, said firing capacitor recharging to ready the firing circuit for later firing after the nuclear explosion is over.

3 Claims, 1 Drawing Figure

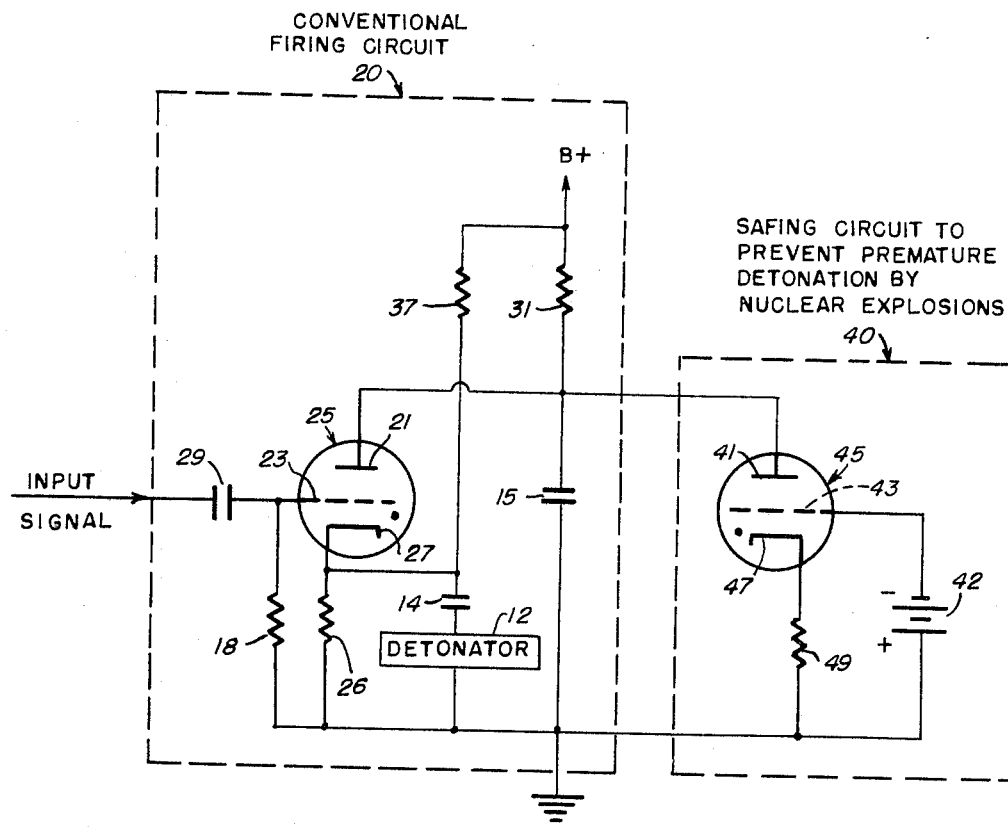

_3,916,252_

THYRATRON SAFETY CIRCUIT

The invention described herein may be manufactured and used by or for the Government for governmental purposes without the payment to me of any royalty thereon.

This invention relates generally to detonator firing circuits, and more particularly to means in combination with a conventional type of detonator firing circuit employing a gas-tube thyratron which maintains the firing circuit safe in the presence of a nuclear explosion without permanently dudding the firing circuit for use at the proper time when the explosion is over.

Recent tests of detonator firing circuits employing conventional gas-tube thyratrons have rather conclusively revealed that a high proportion of such thyratrons fire when in the vicinity of a nuclear explosion. This occurs because for a fraction of a second during a nuclear explosion, sufficient neutron bombardment and intense electromagnetic fields are produced which ionize the gas of the thyratron causing it to fire. A serious problem has thus arisen since it would be possible to activate a conventional thyratron-tube firing circuit of a missile by a nuclear explosion so as to cause premature detonation of the missile before it reaches its target, thereby defeating the missle or greatly reducing its effectiveness. It is of very great importance, therefore, that some means be devised to overcome this serious problem. missle Accordingly, it is the chief object of the present invention to provide simple means in combination with a conventional thyratron-tube firing circuit for maintaining the firing circuit safe in the presence of a nuclear explosion.

An additional object is to provide means which permit the firing circuit to recover after the nuclear explosion is over and permit the firing circuit to activate the detonator at the proper time.

These objects are accomplished in the present invention in an amazingly simple manner merely by employing in combination with the firing circuit, a safing circuit comprising a second thyratron and a couple of associated circuit elements. The second thyratron is located either at the same place as the first thyratron so that a nuclear explosion causes both thyratrons to fire simultaneously, or, the second thyratron is located at a place with less shielding so that it fires slightly before the first thyratron. The safing circuit is constructed so that the firing of the second thyratron prevents any significant amount of energy from being applied to the firing circuit detonator as a result of the firing of the first thyratron. The safing circuit is further constructed so that a predetermined time after the nuclear explosion is over, the first thyratron is able to recover and properly fire to permit energy to be applied to the detonator when an input signal is received at the desired time.

The specific nature of the invention, as well as the other objects, uses, and advantages thereof, will clearly appear from the following description and from the accompanying drawing which is a circuit diagram of a safing circuit in combination with a conventional firing circuit in accordance with the invention.

In the drawing, a conventional firing circuit 20 is adapted to be fired by the receipt of an input signal at a desired time. A firing circuit thyratron tube 25 has a plate 21, a grid 23 and a cathode 27, the thyratron grid 23 being connected through a coupling capacitor 29 to receive the input signal. A firing capacitor 15 has one side grounded and the other side connected through a resistor 31 to a source of d-c voltage B+. The B+ voltage is chosen to have a value sufficient to fire the thyratron 25. The thyratron plate 21 is connected to a point intermediate the resistor 31 and the firing capacitor 15, and the thyratron cathode 27 is connected through a resistor 26 to circuit ground. The resistor 18 between the thyratron grid 23 and circuit ground serves as a conventional grid resistor for the thyratron 25. A negative bias is applied to hold the thyratron 25 cut-off under normal conditions by means of a resistor 37 connected between B+ and the thyratron cathode 27. The bias on the thyratron 25 is thus determined by the voltage across the resistor 26. A detonator 12, which is adapted to initiate detonation of a missile (not shown), has one side grounded and the other side connected to the cathode 27 through a coupling capacitor 14. The coupling capacitor 14 prevents the bias voltage across the resistor 26 from appearing across the detonator 12. In accordance with well known practice, the B+ voltage source is initially applied slowly to prevent any appreciable amount of energy from being applied to the detonator 12 before the capacitor 14 is charged to the bias voltage.

In conventional operation of the firing circuit 20, the input signal is fed through the coupling capacitor 29 to the thyratron grid 23, overcoming the negative bias provided by the voltage across the resistor 26, causing the thyratron 25 to fire. The firing capacitor 15, which has charged up to the B+ voltage through the resistor 31, then discharges through the thyratron 25 and the coupling capacitor 14 to the detonator 12 to cause activation thereof. When the firing capacitor 15 discharges to a voltage below the conduction voltage of the thyratron 25, the thyratron 25 cuts off and the capacitor 15 recharges to B+ through the resistor 31. The firing circuit 20 is then once again ready for operation. The resistor 31 is chosen so that the firing capacitor 15 charges up to B+ at a relatively low rate compared to its rate of discharge.

When such a conventional firing circuit 20 is in the vicinity of a nuclear explosion, it has been found that the intense neutron bombardment and intense electromagnetic fields produced by the explosion ionize and fire the thyratron tube 25, causing premature activation of the detonator 12 just as if the proper input signal appeared. To prevent the nuclear explosion from activating the detonator 12, a safing circuit 40 is connected in combination with the conventional firing circuit 20, as shown in the drawing. A safing circuit thyratron tube 45 is located either at the same place as the firing circuit thyratron tube 25 so that a nuclear explosion causes both thyratrons 25 and 45 to fire simultaneously, or, the safing circuit thyratron 45 is located at a place with less shielding so that it fires slightly before the firing circuit thyratron 45. The plate 41 of the thyratron 45 is connected to the plate 21 of the thyratron 25, the cathode 47 is connected to circuit ground through a resistor 49, and the grid 43 is connected to a negative bias provided by a battery 42 connected between the grid 43 and circuit ground. The thyratron grid 43 is preferably biased with a lower voltage than the thyratron grid 23 of the thyratron 25 so as to more readily fire in response to the effects of the nuclear explosion.

It will thus be understood that when a nuclear explosion takes place in the vicinity of the firing circuit 20 and the accompanying safing circuit 40, either both thyratrons fire simultaneously, or the safing circuit thyratron 45 fires slightly ahead because of its lower bias voltage or reduced shielding. The resistor 49 is chosen to be of a very much lower value than the resistance of the detonator 12 so that the firing of the thyratron 45 effectively shorts out the firing capacitor 15, thereby causing substantially no energy to be applied to the detonator 12. The resistor 49 serves as a protective resistance to prevent damage of the thyratron 45 by high currents. When the nuclear explosion is over, the thyratrons 25 and 45 both deionize, and the firing capacitor 15 recharges to B+ through the resistor 31. The firing circuit is then again ready for firing, and upon receipt of an input signal at the desired time, will operate properly and independently of the safing circuit 40, since the safing circuit 40 is unaffected by the input signal applied to the firing circuit 20. It is to be noted that the firing circuit will be kept safe and recover for any number of nuclear explosions which may occur before receipt of the desired input signal at the proper time.

The only disadvantage of the circuit shown in the drawing is that a nuclear explosion which occurs at the same time as the input signal is received, or at a time immediately before receipt of the input signal (when the firing circuit has not yet sufficiently recovered), will result in masking the input signal so as to prevent the detonator 12 from being activated. A nuclear explosion occurring at just this time is quite unlikely, but in any event this disadvantage may easily be overcome by providing an input signal consisting of a properly spaced series of pulses rather than a single pulse, thus when the nuclear explosion is over the desired activation of the detonator 12 will take place.

In accordance with this invention, therefore, three necessary features are achieved in overcoming the aforementioned problem. First, the firing circuit 20 is made safe in the presence of a nuclear explosion; secondly, the firing circuit is able to recover after any number of nuclear explosions and then operate properly at the desired time; and thirdly, the above two features are accomplished merely by the addition of a thyratron tube in an amazingly simple circuit which can readily by incorporated with conventional firing circuits without prohibitively increasing the size or weight thereof.

It will be apparent the the embodiment shown in the drawing is only exemplary and the various modifications can be made in construction and arrangement within the scope of the invention as defined in the appended claims.

I claim as my invention:

1. In combination with a firing circuit having a gas-tube thyratron, an electronic safing circuit for maintaining the firing circuit safe in the presence of a nuclear explosion without permanently dudding the firing circuit for use after the explosion is over; said firing circuit comprising in addition to said thyratron: means applying a cut-off bias to said thyratron, means for applying an input signal to overcome said bias and fire said thyratron, a firing capacitor, means for charging said capacitor to a voltage sufficient to fire said thyratron, and a load; said thyratron, capacitor and load being connected so that the firing of said thyratron by said input signal causes said capacitor to discharge through said thyratron to activate said load; said safing circuit comprising; a second gas-tube thyratron located so as to be at least as sensitive to firing by a nuclear explosion as is the gas-tube thyratron of said firing circuit, means biasing said second thyratron to cut-off, and means connecting said second thyratron effectively in parallel with said firing capacitor; the occurrence of a nuclear explosion thereby causing said second thyratron to fire no later than simultaneously with the thyratron of said firing circuit, whereupon said second thyratron effectively shorts out said capacitor so that substantially no energy flows to said load, said firing capacitor recharging to ready the firing circuit for later firing after the nuclear explosion is over.

2. In combination with a firing circuit having a gas-tube thyratron, an electronic safing circuit for maintaining the firing circuit safe in the presence of a nuclear explosion without permanently dudding the firing circuit for use after the explosion is over, said thyratron having at least a plate, a grid and a cathode, said firing circuit comprising in addition to said thyratron: means applying a cut-off bias between the grid and cathode of said thyratron, means applying an input signal to said grid to overcome said bias and fire said thyratron, a firing capacitor, means for charging said capacitor to a voltage sufficient to fire said thyratron, and a load, said thyratron, capacitor and load being connected so that the firing of said thyratron when said input signal is applied to said grid causes said capacitor to discharge through said thyratron between the plate and cathode thereof to activate said load; said safing circuit comprising: a second gas-tube thyratron having a plate, a grid and a cathode located so as to be at least as sensitive to firing by a nuclear explosion as is the gas-tube thyratron of said firing circuit, means applying a cut-off bias between the grid and cathode of said second thyratron, a protective resistor in series with the plate and cathode of said second thyratron, said resistor being of a very much lower value than the resistance of said load, and means connecting the series combination of said resistor and the plate and cathode of said second thyratron in parallel with said firing capacitor; the occurrence of a nuclear explosion thereby causing said second thyratron to fire no later than simultaneously with the thyratron of said firing circuit, whereupon most of the energy in said capacitor passes through said second thyratron and said resistor so that substantially no energy flows to said load, said firing capacitor recharging to ready the firing circuit for later firing after the nuclear explosion is over.

3. A firing circuit protected against premature detonation due to nuclear explosions comprising: a firing tube and a protective tube in parallel connection, a firing capacitor connected in parallel with said protective and firing tubes, voltage means connected to said firing capacitor for charging said capacitor to some predetermined value, biasing means connected to said protective tube for rendering the protective tube normally nonconducting, a detonator connected to said firing tube, means for causing said protective tube to ionize at the same time or before the firing tube ionizes in the presence of a nuclear explosion, and means for causing said firing capacitor to discharge through said protective tube rather than said firing tube when both of said tubes are ionized.

\* \* \* \* \*